US008621070B1

(12) United States Patent
Venneti et al.

(10) Patent No.: US 8,621,070 B1
(45) Date of Patent: Dec. 31, 2013

(54) STATISTICAL PROFILING OF CLUSTER TASKS

(75) Inventors: Satya Venneti, Pittsburgh, PA (US); Ronald William Kownacki, Pittsburgh, PA (US); Sundeep Katepalli, Mars, PA (US); John DeGraaf, Cranberry Township, PA (US)

(73) Assignee: NetApp Inc., Sunnyvale, CA (US)

( * ) Notice: Subject to any disclaimer, the term of this patent is extended or adjusted under 35 U.S.C. 154(b) by 460 days.

(21) Appl. No.: 12/971,870

(22) Filed: Dec. 17, 2010

(51) Int. Cl.
 *G06F 15/173* (2006.01)
(52) U.S. Cl.
 USPC .......................................... 709/224; 709/223
(58) Field of Classification Search
 USPC ........................................................ 709/224
 See application file for complete search history.

(56) References Cited

U.S. PATENT DOCUMENTS

| | | | | |
|---|---|---|---|---|
| 7,680,619 B1* | 3/2010 | Lei | | 702/108 |
| 7,756,827 B1* | 7/2010 | Yung et al. | | 707/634 |
| 8,095,933 B2* | 1/2012 | Berstis et al. | | 718/104 |
| 8,321,558 B1* | 11/2012 | Sirota et al. | | 709/224 |
| 2002/0026535 A1* | 2/2002 | Srinivasan | | 709/320 |
| 2002/0122077 A1* | 9/2002 | Doney et al. | | 345/853 |
| 2003/0135621 A1* | 7/2003 | Romagnoli | | 709/226 |
| 2003/0149717 A1* | 8/2003 | Heinzman | | 709/101 |
| 2004/0230636 A1* | 11/2004 | Masuoka et al. | | 708/800 |
| 2006/0235732 A1* | 10/2006 | Miller et al. | | 705/7 |
| 2007/0299849 A1* | 12/2007 | Egetoft | | 707/10 |
| 2008/0034004 A1* | 2/2008 | Cisler et al. | | 707/200 |
| 2008/0229322 A1* | 9/2008 | Berstis et al. | | 718/106 |
| 2008/0249757 A1* | 10/2008 | Berstis et al. | | 703/13 |
| 2010/0049577 A1* | 2/2010 | McGowan | | 705/9 |
| 2011/0113008 A1* | 5/2011 | Jafri et al. | | 707/608 |
| 2011/0113215 A1* | 5/2011 | Thomas et al. | | 711/173 |
| 2011/0197090 A1* | 8/2011 | Colbert et al. | | 714/2 |
| 2011/0258605 A1* | 10/2011 | Ioannou et al. | | 717/126 |
| 2012/0079108 A1* | 3/2012 | Findeisen | | 709/224 |
| 2012/0117223 A1* | 5/2012 | Jennings et al. | | 709/224 |
| 2012/0323628 A1* | 12/2012 | Jaster et al. | | 705/7.29 |

* cited by examiner

*Primary Examiner* — Waseem Ashraf
(74) *Attorney, Agent, or Firm* — Cooper Legal Group LLC

(57) ABSTRACT

A variety of complex multiphase tasks may execute within a cluster network environment. It may be advantageous to track and analyze the processing of such multiphase tasks. Accordingly, one or more techniques and/or systems are disclosed for tracking the processing of a multiphase task within a cluster network environment. In particular, runtime support for recording task processing annotations may be embedded into a multiphase task using an analysis model. The analysis model may specify task processing annotations that are to be recorded during one or more phases of processing the multiphase task. During execution, task processing annotations may be recorded and associated with corresponding phases of the multiphase task. Task processing annotations may be aggregated into aggregated statistical task data. The aggregated statistical task data may be used to generate views of statistical data, which may provide insight into the cluster network environment (e.g., problematic nodes, bottlenecks, etc.).

21 Claims, 11 Drawing Sheets

VIEW OF STATISTICAL DATA

DETAILS (1) — 1004

| App | Txn ID | Txn Co-ordinator | Module | Time Created | Txn Originator | Result | Acquire Latency (ms) | Held Latency (ms) | Node | Commit Latency (ms) | Global Commit Latency (ms) | Lifetime (ms) |
|---|---|---|---|---|---|---|---|---|---|---|---|---|
| Management | <19,16,16> | Cluster-Node1 | capability: can_boot | 11/2/2010 11:56:31 | Cluster-Node1 | Commit | 0 | 1067 | Cluster-Node1<br>Cluster-Node2 | 2784<br>365 | 3345 | 4418 |

DETAILS (2) — 1006

| App | Txn ID | Txn Co-ordinator | Module | Time Created | Txn Originator | Result | Acquire Latency (ms) | Held Latency (ms) | Node | Commit Latency (ms) | Global Commit Latency (ms) | Lifetime (ms) |
|---|---|---|---|---|---|---|---|---|---|---|---|---|
| Management | <19,18,18> | Cluster-Node1 | capability: can_boot | 11/2/2010 11:56:37 | Cluster-Node2 | Commit | 4100 | 1029 | Cluster-Node1<br>Cluster-Node2 | 148<br>185 | 433 | 1587 |

DETAILS (3) — 1008

| App | Txn ID | Txn Co-ordinator | Module | Time Created | Txn Originator | Result | Acquire Latency (ms) | Held Latency (ms) | Node | Commit Latency (ms) | Global Commit Latency (ms) | Lifetime (ms) |
|---|---|---|---|---|---|---|---|---|---|---|---|---|
| Management | <21,4,4> | Cluster-Node1 | Recovery: online reconciliation | 11/2/2010 17:39:33 | Cluster-Node2 | Abort | 0 | 5481 | Cluster-Node1 | 14 | 6 | 5484 |
| Management | <23,4,4> | Cluster-Node1 | Recovery: online reconciliation | 11/4/2010 13:07:01 | Cluster-Node2 | Abort | 1 | 4226 | Cluster-Node1 | 14 | 6 | 4226 |

FIG. 10

STATISTICAL PROFILING OF CLUSTER TASKS

FIELD

The instant disclosure pertains to collecting, aggregating, and presenting statistical data corresponding to modeled multiphase tasks performed within a clustered network environment.

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented. For example, a cluster network environment comprising a plurality of nodes (e.g., one or more storage servers, one or more computing devices, etc.) may be used to facilitate the storage, retrieval, and/or processing of data.

Many cluster tasks performed within the cluster network environment may involve complex distributed algorithms that may execute in a cluster-wide scope across multiple nodes. For example, a data replication task may move volumes of user data between multiple nodes. The data replication task may involve many phases, such as an acquire, a hold, a commit on a first node, a commit on a second node, a commit on a third node, and/or a global commit. Unfortunately, a user, such as a developer, may lack visibility into the execution of the task and/or its phases. Thus, the user may be unable to track task execution workflow across one or more nodes (e.g., what nodes executed the task, what occurred at respective nodes during execution, timestamps of events, etc.), compute statistics at various granularities (e.g., latency of a task at a particular node, etc.), and/or detect particular causes of issues (e.g., I/O failures, communication failures, node failures, variable timing between phases of a task, maxed out resources, bottlenecks, etc.).

Currently, individual monitoring mechanisms may extract details on a node by node basis. In this way, the monitors may collect a vast amount of contextually unassociated details from various nodes within the cluster network environment. The details may be pieced together in an attempt to aggregate the details into a view of what occurred during execution of cluster tasks within the cluster network environment. Unfortunately, the view may not provide sufficient information to determine where tasks failed, how the tasks failed, where tasks slowed down, whether certain tasks or are all tasks are affected by a particular problem, etc.

SUMMARY

This disclosure relates to one or more techniques and/or systems that provide for tracking the processing of multiphase tasks within a cluster network environment. In particular, an analysis model may be incorporated into a multiphase task (e.g., a backup task, a data replication task, a quorum maintenance task, an administrative job monitoring task, and/or other data storage and administrative tasks that may be performed within a cluster network environment). The analysis model may specify task processing annotations that are to be recorded during one or more phases of processing the multiphase task. In one example, the analysis model may designate one or more phases for a multiphase task (e.g., an acquire phase, a hold phase, one or more node commit phases, and/or other phases of a data replication task). For respective phases, the analysis model may specify task processing annotations that are to be recorded, such as a volume size associated with data processed by the multiphase task, information of a node executing the multiphase task, a start/end time of a phase, and/or a wide variety of other criteria (e.g., a designer of the multiphase task may specify within the analysis model any type of information relating to multiphase task processing to be recorded as task processing annotations).

During execution of the multiphase task across one or more nodes within the cluster network environment, task processing annotations specified by the analysis model may be recorded and/or associated with corresponding phases of the multiphase task. For example, the multiphase task may be performed using one or more threads executing on one or more nodes. Task processing annotations may be recorded within subvectors of remote procedure calls that are made to nodes during execution. In this way, task processing annotations may be recorded within subvectors in a systematic manner even though the multiphase task may execute on multiple nodes and/or multiple threads. In one example, the subvector may be recorded within threads owned by the multiphase task to reduce latency that may be caused by competition for processing resources. The multiphase task may upload the subvectors to a separate process (e.g., a stats processing thread executing on an analysis node within the cluster computing environment). The various subvectors may be combined to create a statistics vector comprising task processing annotations that may have been recorded during the execution of the multiphase task across one or more nodes and/or threads. In another example, the multiphase task may aggregate recorded task annotations into a single object, such as a statistics vector. The multiphase task may pass the statistics vector to a statistics processing thread, for example, after completion of the multiphase task. In this way, the statistics processing thread may process the statistics vector using a variety of statistical and/or data formatting techniques.

The recorded task processing annotations may be processed (e.g., on the fly; preprocessed and stored; etc.) to generate views of statistical data. In one example, task processing annotations may be aggregated with previously recorded task processing annotations to generate aggregated statistical task data. For example, task processing annotations may be averaged together to create the aggregated statistical task data. It may be appreciated that the recorded task processing annotations may be processed using a variety of statistical and/or data formatting techniques. In this way, a view of statistical data may be presented to a user in response to a user request. In one example, the view may provide a macroscopic view of multiphase task processing within the cluster network environment. In other examples, the view may provide finer detailed views of particular multiphase tasks, phases, time periods, nodes, etc.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 10 is an illustration of an example of a view of statistical data corresponding to the processing of one or more multiphase tasks within a cluster network environment.

DETAILED DESCRIPTION

Figure 1:
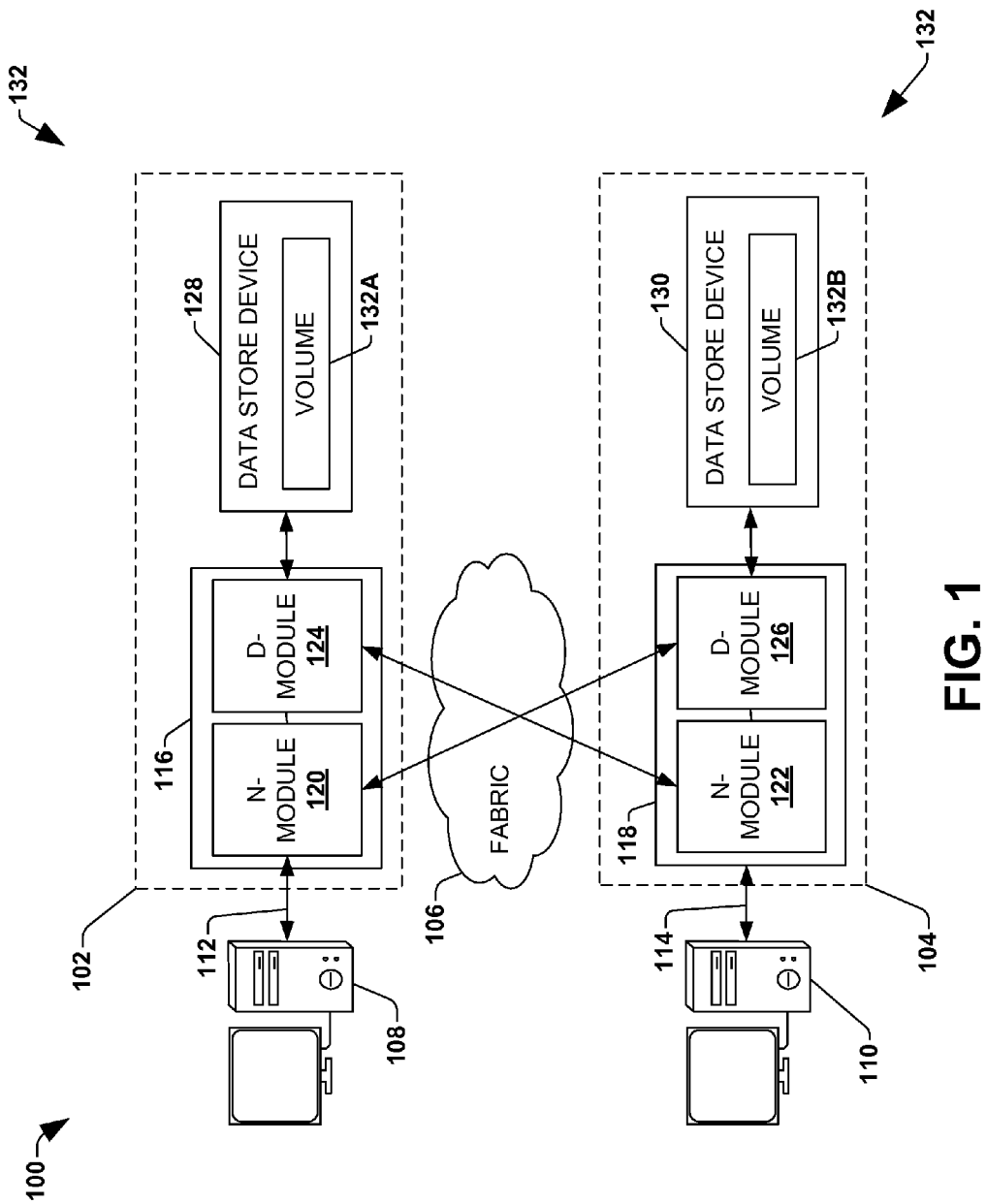
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

In a cluster network environment, clients may store, access, and/or process data across a plurality of nodes (e.g., one or more). In particular, tasks may be executed across one or more nodes of the cluster network environment to facilitate such storage, access, and/or processing of data. Additionally, tasks may be executed to perform administrative jobs, such as data backup, node health monitoring, movement of data, configuration, etc. It may be advantageous to track the execution of such tasks across the cluster network environment.

Accordingly, an analysis model may be incorporated into a multiphase task. The analysis model may specify one or more phases for the multiphase task and/or task processing annotations that are to be recorded during the processing of the respective phases. For example, a design engineer of a data replication task may specify particular phases for the data replication task within an analysis model. Additionally, the design engineer may specify task processing annotations corresponding to events and/or statistics that may occur during processing of the data replication task. The recorded task processing annotations may provide insight into execution workflow of the data replication task across one or more nodes, latency statistics at particular nodes, and/or potential causes of issues that may arise during the execution of the data replication task (e.g., I/O failures, communication failures, node failures, variable timing between phases of a task, maxed out resources, bottlenecks, etc.).

Figure 2:
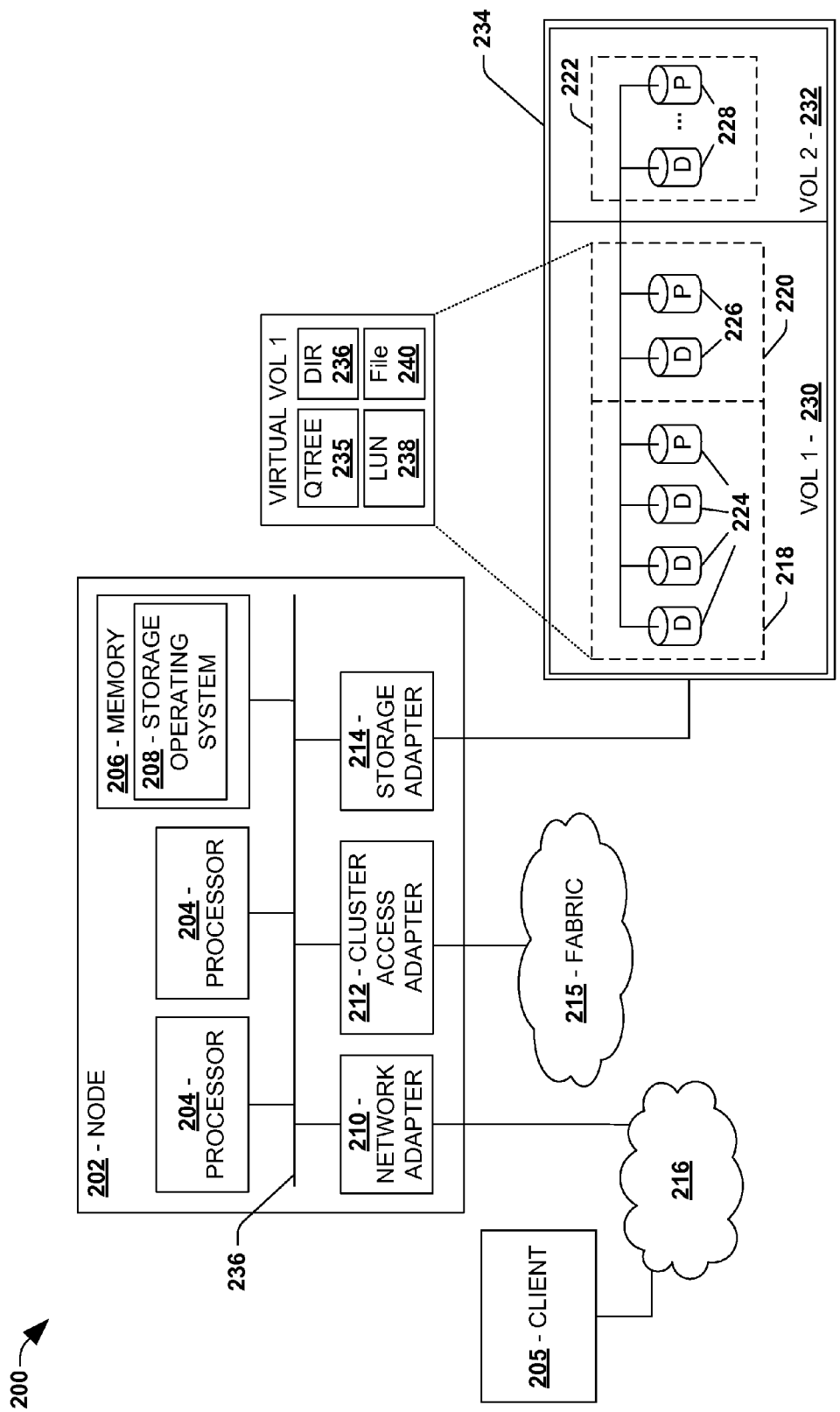
FIG. 2 is a component block diagram illustrating an example data storage system in accordance with one or more of the provisions set forth herein.

To provide a context for an embodiment for tracking the processing of multiphase tasks within a cluster network environment, FIG. 1 illustrates a clustered network environment 100, for example, within which multiphase tasks may be processed and/or tracked, and FIG. 2 illustrates an embodiment of a data storage system that may be implemented to store and manage data in this clustered network environment, including task processing annotations, aggregated statistical task data, and/or views of statistical data, for example. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality (e.g., one or more) of storage systems and/or nodes located in a plurality (e.g., one or more) of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality (e.g., one or more) of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that tasks, such as multiphase tasks may be executed by one or more nodes within the cluster network environment 100. In one example, a data replication task may execute, for example as one or more threads, on nodes 116, 118. For example, the data replication task may retrieve data from data storage device 128 during a first phase, and store the data to data storage device 130 during a second phase. In this way, the data replication task (a multiphase task) may execute on one or more nodes within the cluster network environment 100. It may be advantageous to record various information, events, and/or statistics as the data replication task executes on nodes 116, 118. For example, it may be useful to record what application generated the task, the result of the task, the creation time of the task, a time for a master node to acquire the task, a time for an originating node to process the task, a time for a commit on the master node, and/or a variety of other information that may be useful in analyzing the processing of the multiphase task, for example. Additionally, an analysis component, which may be any node (or across multiple nodes) within the cluster network environment 100, may be configured to receive, process, and/or present the recorded task data (e.g., an administrator may utilize a user interface to view various presentations of the recorded task data at various granularities as provided by the analysis component). Thus, in one embodiment, at least some of the invention described herein may be implemented on node 116, node 118, and/or any other node (or across multiple nodes) within the cluster network environment 100.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that tasks, such as multiphase tasks may be executed by one or more nodes within the data storage system 200. For example, a data replication task may execute, for example as one or more threads, on processor 204 of node 202 to copy data stored on volume 230 within data storage device 234. Once the data is copied, the data replication task may execute, for example, as one or more threads, on a processor of a second node to write the copied data to a second volume within a second data storage device connected to the second node. In this way, the data replication task (a multiphase task) may execute on one or more nodes within the data storage system 200. It may be advantageous to record various information, events, and/or statistics as the data replication task executes within the data storage system 200. For example, it may be useful to record what application generated the task, the result of the task, the creation time of the task, a time for a master node to acquire the task, a time for an originating node to process the task, a time for a commit on the master node, and/or a variety of other information that may be useful in analyzing the processing of the multiphase task and/or data storage system 200, for example.

Figure 3:
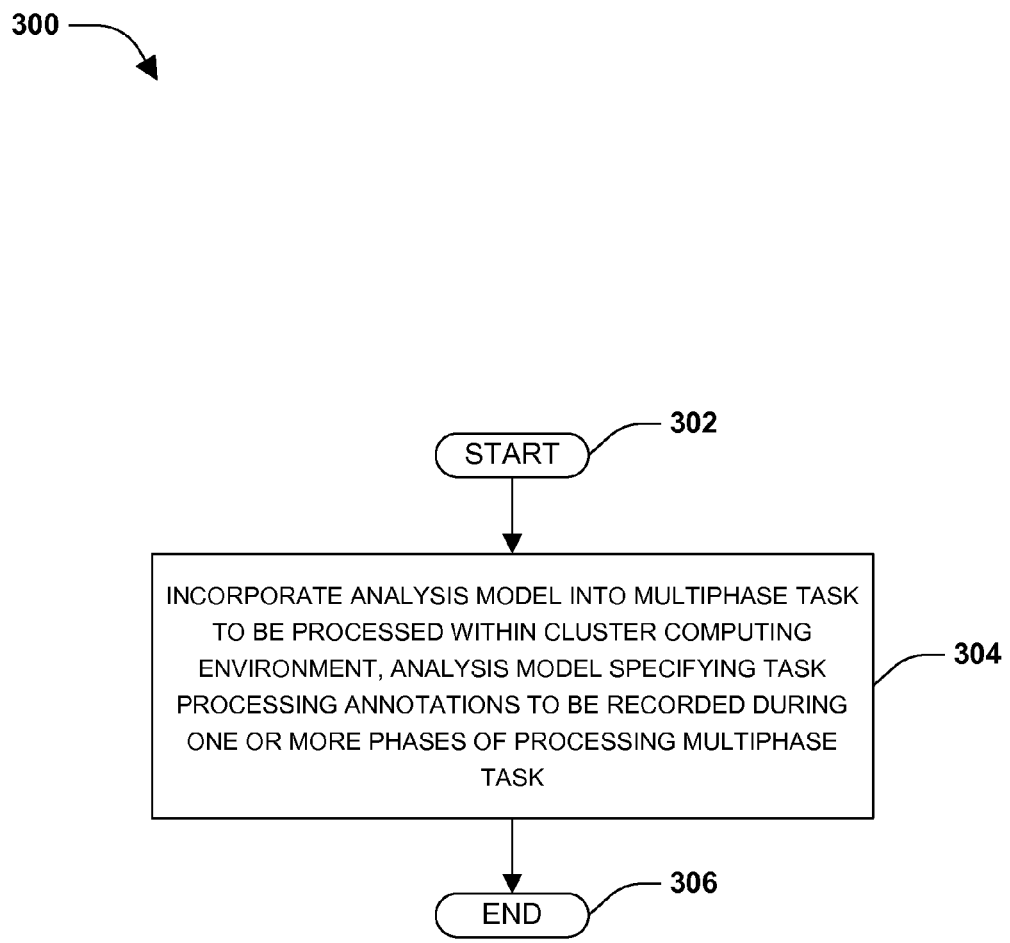
FIG. 3 is a flow chart illustrating an exemplary method of incorporating an analysis model into a multiphase task.

One embodiment of incorporating an analysis model into a multiphase task is illustrated by an exemplary method 300 in FIG. 3. At 302, the method starts. At 304, an analysis model may be incorporated into a multiphase task to be processed within a cluster network environment. The analysis model may specify task processing annotations to be recorded during one or more phases of processing the multiphase task. The analysis model may specify the one or more phases of the multiphase task using identifiers and/or one or more associated task processing annotations to be recorded during the respective phases. In one example, the multiphase task may correspond to a data replication task, a quorum maintenance task (e.g., a check to determine whether a majority of nodes are operational), a health task (e.g., a check to determine whether a node is operating as desired), a configuration task (e.g., configuration of a node), a backup task (e.g., backup of user data), a volume data movement task, an administrative job monitoring task (e.g., monitoring active administrative jobs), and/or any other tasks that may be performed within a cluster network environment.

In one example, the task processing annotations may correspond to: a source node of a phase, a volume size, a type designation, a start time of a phase, an end time of a phase, a processing time of a phase on one or more nodes, health information of one or more nodes processing the multiphase task, user defined measurement criteria (e.g., a user, such as a developer of the multiphase task, may specify any type of criteria to measure), a type of phase, a reporter of a phase, a result of a phase, and/or any information relating to the processing of the multiphase task. In another example, the task processing annotations may correspond to what application generated a transaction, a unique identifier of the transaction, a master node that coordinated that transaction cluster-wide, a label or type of module within the application that created the transaction, a creation time of the transaction, a node originating the transaction, a result of the transaction (e.g., commit, success, fail, abort, etc.), a time taken for the master node to acquire the transaction, a time taken for the originating node to process the transaction, a time taken for the commit on the master node, a time taken for the commit on other nodes within the cluster network environment, a time take for a lifetime of the transaction, etc.

In one example of incorporating an analysis model into a multiphase task, an application designer may specify an analysis model during design time of an application (multiphase task). The application designer may specify various phases of the application's execution to record with the analysis model (e.g., data may be read from a first node during a first phase, data may be written to a second and third node during a second phase, a commit may be performed at a master node during a third phase, etc.). Additionally, the application designer may desire to record specific statistical information regarding the execution of the application. Thus the application designer may specify task processing annotations that are to be recorded during execution of the respective phases of the application (e.g., a commit time at the master node may be recorded during the third phase). In this way, the application designer may specify the analysis model. Before runtime of the application, the analysis model may be incorporated into the application by providing runtime support for recording the task processing annotations. For example, instruction code, that when executed may perform the actual recording functionality, may be embedded into code of an application before execution of the application. In this way, the embedded instruction code may be executed during runtime of the application.

It may be appreciated that the multiphase task may be processed across one or more nodes within the cluster network environment. For example, the multiphase task may comprise a first phase that may be associated with a first node and a second phase associated with a second node. During processing, task processing annotations specified by the analysis model may be recorded and/or associated with corresponding phases of the multiphase task. Because the processing of the multiphase task may involve multiple nodes, phases, and/or task processing annotations, the recording of task processing annotations and/or the associating of task processing annotation with corresponding phases may be performed within process threads owned by the multiphase task. That is, the multiphase task owns the execution of recording the task processing annotations. Thus, task processing annotations may be recorded without slowing down the processing of the multiphase task because the recording task may not separately compete for computational resources. It will be appreciated that while language such as first phase associated with first node and second phase associated with second node or like language may be used herein, that such language is not meant to be limiting. For example, there may be any number of nodes whereon any number of phases of any number of multiphase tasks may be comprised, where different nodes may comprise differing numbers of tasks and/or phases. Similarly, language such as first and second are generally merely used as identifiers herein and not necessary to indicate an ordering of things (e.g., one item coming (temporally) before another). It may be appreciated that one or more phases may be repeated/distributed (e.g., multiple instances of a/the same phase) across multiple nodes, and are not limited to a phase per node (e.g., a phase may correspond to processing on multiple nodes and/or multiple phases may correspond to a single node). For example, a phase may correspond to a global commit that may occur on multiple nodes (e.g., a single phase may correspond to a commit on a first node, a commit on a second node, a commit on a third node, etc.) and/or may occur multiple times on a single node. In another example where a phase may comprise a repeated subtask, a multiphase task may comprise three phases, a first phase to take a snapshot backup of a source data volume, a second phase to transfer large blocks of data in sequence to a destination data volume (e.g., 500 large blocks of data may be sequentially transferred), and a third phase to update the snapshot based upon the data transfer. In this example, the second phase is not limited to a single iteration, but may be repeated 500 times. That is, the second phase of the multiphase (e.g., three phase) task may comprise a subtask that is repeated 500 times, for example. In such a situation (where there are multiple instances of the same phase), the different instances (of the same phase) may have the same phase id, such as a particular subtask id, for example, but may have different instance numbers, names, ids, etc.

In one example, because the multiphase task may execute across more than one node, task processing annotations may be recorded as subvectors within remote procedures calls to nodes executing the multiphase task. The subvectors may be used by a stat processing thread to build a statistics vector. The stat processing thread may be configured to process the statistics vector (e.g., generate views of statistical data based upon aggregated statistical task data derived from task processing annotations stored in one or more subvectors or statistical vectors).

In one example, upon completion of the multiphase task, the recorded task processing annotations may be uploaded to a node (e.g., an analysis node comprising a statistics processing thread configured to store and/or process the task processing annotations into views of statistical data). The task processing annotations may be aggregated with previously recorded task processing annotations, for example, by a statistics processing thread of an analysis component on an analysis node, to generate aggregated statistical task data. For example, task processing annotations may be averaged with the previously recorded task processing annotations to generate the aggregated statistical task data. The aggregated statistical task data may be stored as one or more entries within a data store. If the data storage usage of the data store exceeds a predetermined threshold, then one or more entries may be removed (e.g., older entries may be removed). It may be appreciated that statistics may be computed on the fly based upon a request for a view of statistical data.

A request to generate a view of statistical data corresponding to the processing of one or more multiphase tasks or portions thereof may be received. In one example, a user, such as an operator/administrator of the cluster network environment, may request a general overview corresponding to the execution of multiphase tasks within the cluster network environment. In another example, a user may request a view corresponding to a particular multiphase task that may have executed one or more times within the cluster network environment. It may be appreciated that a variety of views corresponding to various granularities of multiphase task execution may be generated. The request may comprise user defined statistical criteria that may correspond to the type of view desired. The view of statistical data may be generated based upon at least a portion of the aggregated statistical task data corresponding to the user defined statistical criteria. In this way, a user may be presented with various views of statistical data collected during the execution of one or more multiphase tasks within a cluster network environment based upon customized analysis model. Once the analysis model is incorporated into the multiphase task at 304 in the example method 300 of the FIG. 3, the method 300 ends at 306.

Figure 4:
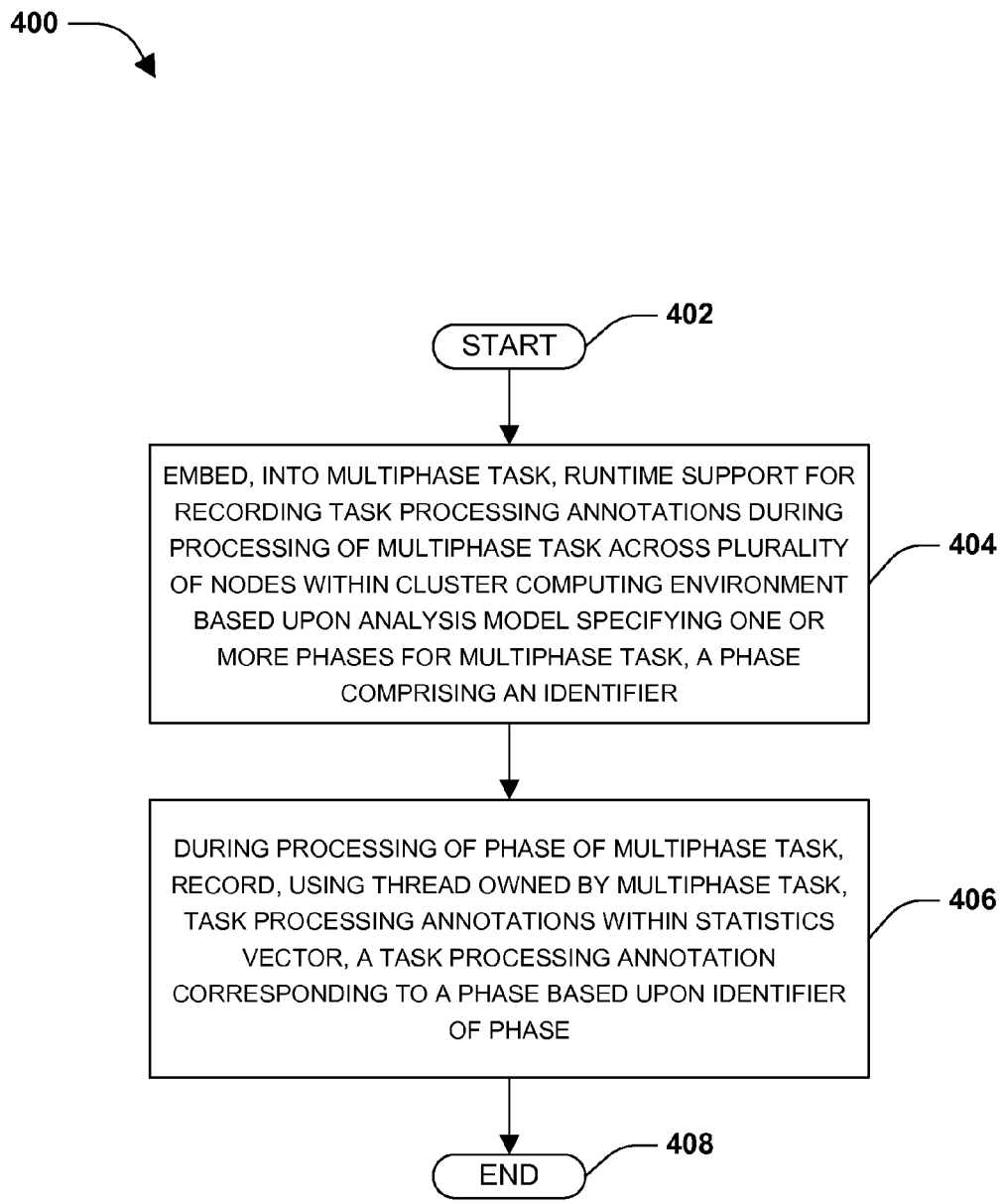
FIG. 4 is a flow chart illustrating an exemplary method of tracking the processing of a multiphase task within a cluster network environment.

One embodiment of tracking the processing of a multiphase task within a cluster network environment is illustrated by an exemplary method 400 in FIG. 4. At 402, the method starts. At 404, runtime support for recording task processing annotations during processing of a multiphase task across one or more nodes within a cluster network environment may be embedded into the multiphase task. The runtime support may be based upon an analysis model specifying one or more phases for the multiphase task, where a phase may comprise an identifier.

In one example, a multiphase task, such as a data replication task, may be processed within the cluster network environment. The data replication task may retrieve data from a first node during a first phase, process the data at a second node during a second and third phase, and store the data at a third and fourth node during a fourth, fifth, and sixth phase of the data replication task, for example. The analysis model may specify task processing annotations that are to be recorded during the execution of the respective phases (e.g., processing time of the first phase at the first node, latency between the processing of the first phase and the second phase, health status of the third node, and/or a variety of other information corresponding to the data replication task and/or the cluster network environment).

At 406, during processing of a phase of the multiphase task, recording task processing annotations within a statistics vector using a thread owned by the multiphase task, where a task processing annotation corresponds to a the phase based upon an identifier of the phase. That is, the multiphase task may be associated with one or more threads executing on one or more nodes. To mitigate processing time lag and/or interference with the processing of the multiphase task, the task processing annotations may be recorded using threads owned by the multiphase task so that the recording does not compete for processing time with task operations being measured. That is, because the threads may be owned by the multiphase task, the threads may be executed immediately following respective task operations being measured or recorded, for example, so as to not compete for resources. Moreover, these threads may be outside of the multiphase processing environment, or are threads that are different than threads comprising or comprised within the multiphase task. Performing this recording processing or aggregation in separate threads provides for inhibiting slow-down of the processing of the multiphase task. After execution of the multiphase task, the statistics vector may be sent to a stat processing thread that may not be owned by the multiphase task. In this way, a statistical vector of recorded task processing annotations may be generating without affecting the processing of the multiphase task. In one example, performance data of the clustered network environment may be presented based upon analyzing the task processing annotations within a statistics vector. At 408, the method ends.

Figure 5:
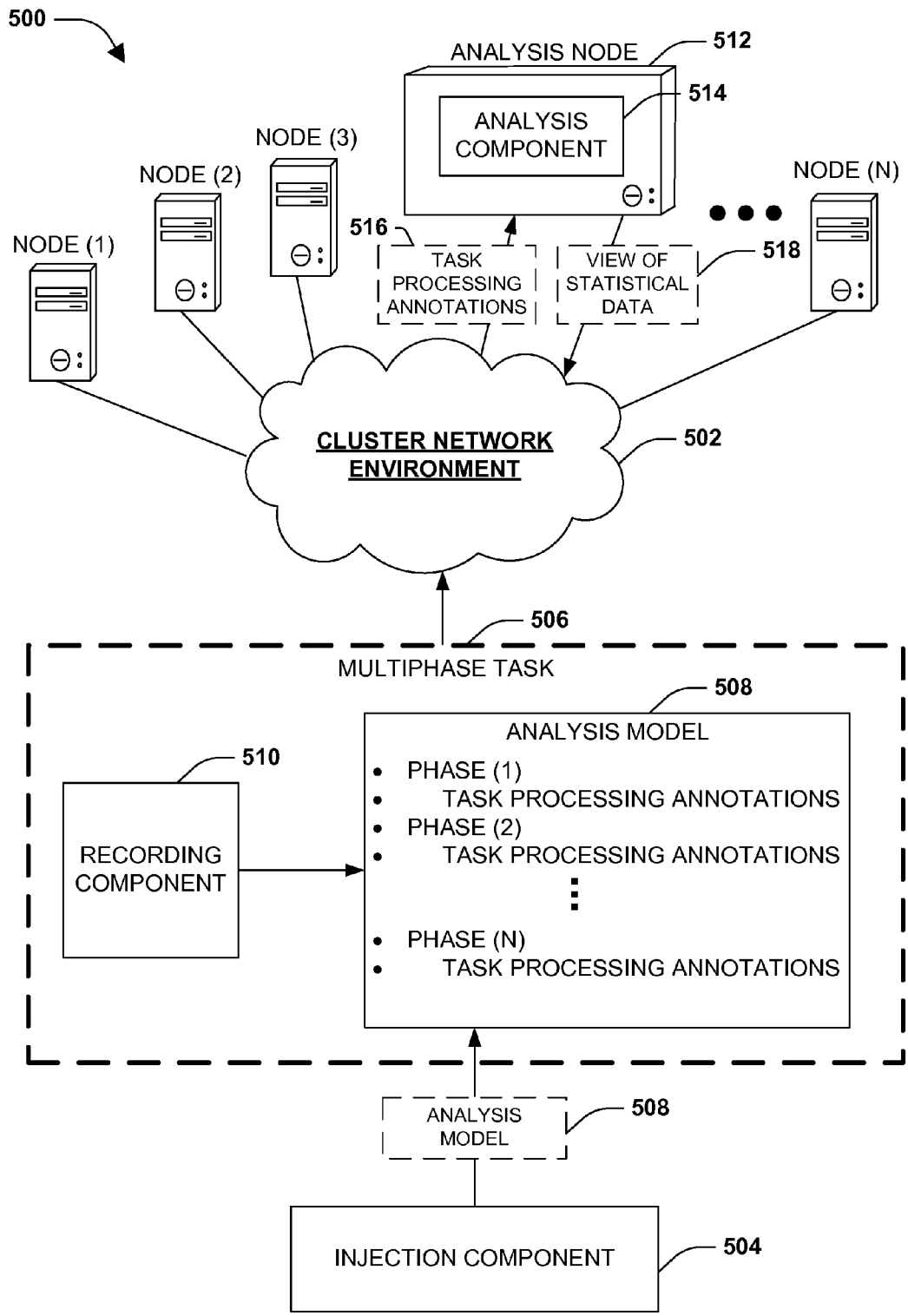
FIG. 5 is a component block diagram illustrating an exemplary system for incorporating an analysis model into a multiphase task.

FIG. 5 illustrates an example of a system 500 configured to incorporate an analysis model 508 into a multiphase task 506. The system 500 may comprise an injection component 504, a recording component 510, and/or an analysis component 514.

It may be appreciated that the multiphase task 506 may be associated with a cluster network environment 502 comprising one or more nodes (e.g., node (1), node (2), node (3), analysis node 512, and/or other nodes such as node (n)). For example, the cluster network environment 502 may comprise a cluster storage system where user data may be stored, accessed, and/or processed across the one or more nodes using multiphase tasks. Additionally, multiphase tasks may be used to perform administrative jobs within the cluster storage environment (e.g., configure a node, check a node's healthy, replicate data, etc.).

In one example, the multiphase task may comprise a data replication task that may retrieve data from node (2), process the data at node (1), store the data at node (1) and node (3), and perform a global commit while executing at node (1). The injection component 504 may be configured to incorporate the analysis model 508 into the multiphase task 506. The analysis model 508 may specify task processing annotations that are to be recording during one or more phases of processing the multiphase task 506. For example, health data of node (1) during a first phase, processing time at node (1) during the first phase, latency between data storing at node (1) and node (3) during a second and third phase, a result of the global commit during a fourth phase, and/or a wide variety of other information may be specified as task processing annotations within the analysis model 508. In this example of a data replication task, at least some of the data transfer may be performed in parallel, as opposed to sequentially, as a single phase. Thus, latency of individual node protocols may not accumulate to affect the overall latency of the data replication task because of the parallel processing.

The recording component 510 may be configured to record task processing annotations specified by the analysis model 508 and/or associate the task processing annotations with corresponding phases of the multiphase task 506 during processing of the multiphase task 506. For example, the recording component 510 may be configured to record task processing annotations within a thread owned by the multiphase task 506.

The analysis component 514 may be configured to receive task processing annotations 516 from the recording component 510 (e.g., the task processing annotations may be received within a statistical vector and/or through subvectors that may be combined into a statistical vector). The analysis component 514 may aggregate the task processing annotations with previously recorded task processing annotations to generate aggregated statistical task data (e.g., similar task processing annotations may be averaged together). The analysis component 514 may be configured to receive a request to generate a view of statistical data 518 corresponding to the processing of one or more multiphase tasks or portions thereof (e.g., multiphase task 506). The request may comprise user defined statistical criteria, such as a particular time span, node, multiphase task, etc. The view of statistical data 518 may be generated based upon at least a portion of the aggregated statistical task data corresponding to the user defined statistical criteria. In this way, statistical data corresponding to multiphase tasks and/or the cluster network environment 502 may be presented.

In one example, the analysis component 514 may be separate from the multiphase task 506 (e.g., a thread executing on the analysis node 512) so that the generation of the view of statistical data 518 does not interfere with the processing of the multiphase task 506.

Figure 6:
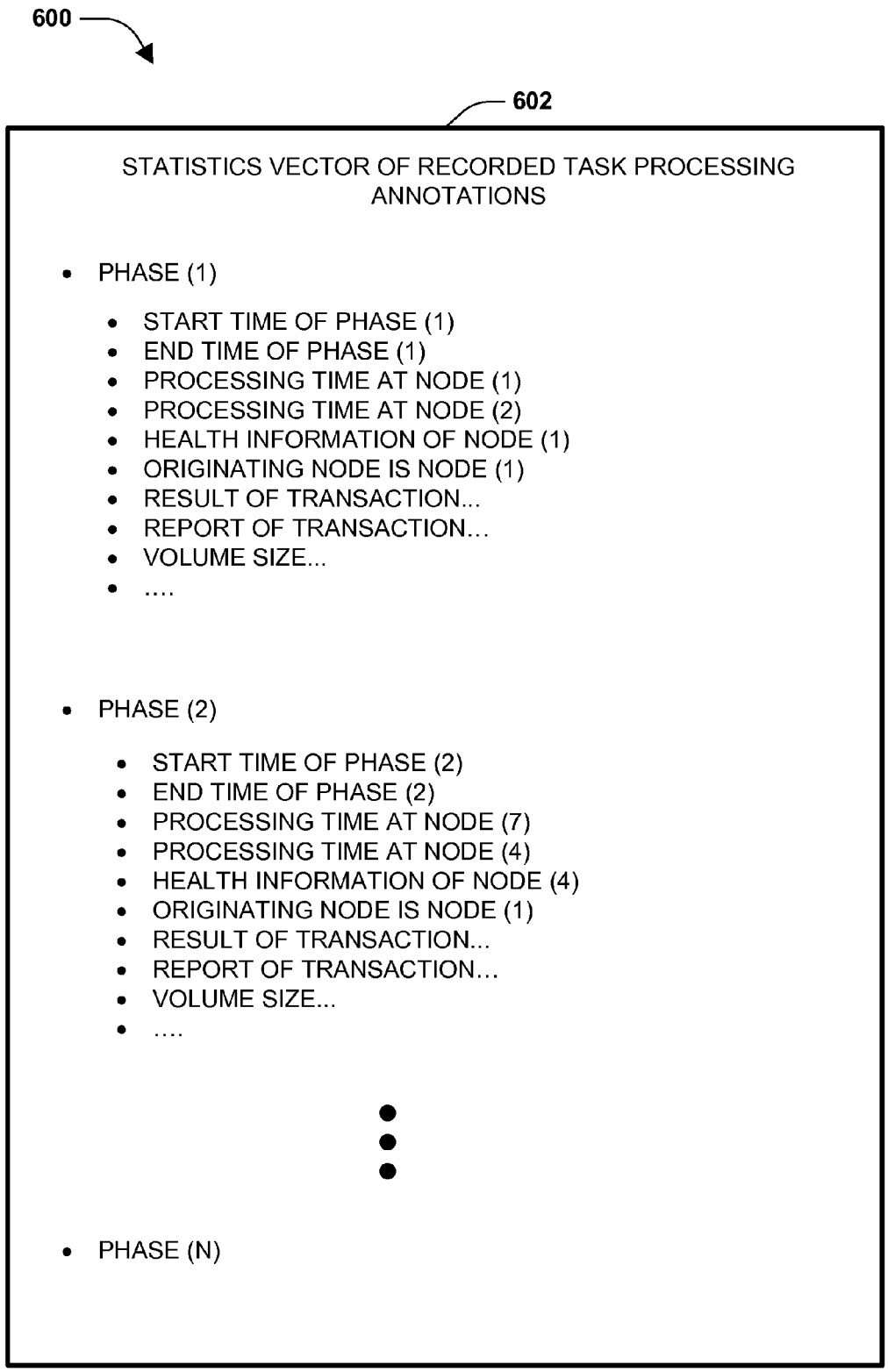
FIG. 6 is an illustration of an example of a statistics vector of recorded task processing annotations.

FIG. 6 illustrates an example 600 of a statistics vector of recorded task processing annotations 602. It may be appreciated that any type of recordable information may be recorded as task processing annotations within the statistics vector. In one example, task processing annotations may be recorded as a set of fields (e.g., start time of a phase, end time of a phase, processing time at a node, health information of a node, originating node, result of transition, report of transaction, volume size, etc.), where a field may be a string, a 64 bit number, and/or any other type. It may be appreciated that a field may be repeated as a list (e.g., a task processing annotation may correspond to a subtask that may be repeated across multiple nodes). In one example, a field may be associated with units. A field may be associated with a description and/or a technique used to display a value of the field. A field may be designated as an averaged field, such that statistic may be computed from the field (e.g., min, max, mean, standard deviation, etc.).

In one example, fields corresponding to task processing annotations recorded during one or more phases may be stored within the statistics vector of recorded task processing annotations 602. In one non-limiting example, fields corresponding to start time of a phase, end time of a phase, processing time at respective nodes, healthy information of a node, originating node, result of a transaction (subtask), report of a transaction (subtask), volume size, and/or a variety of other task processing annotations may be recorded.

Figure 7:
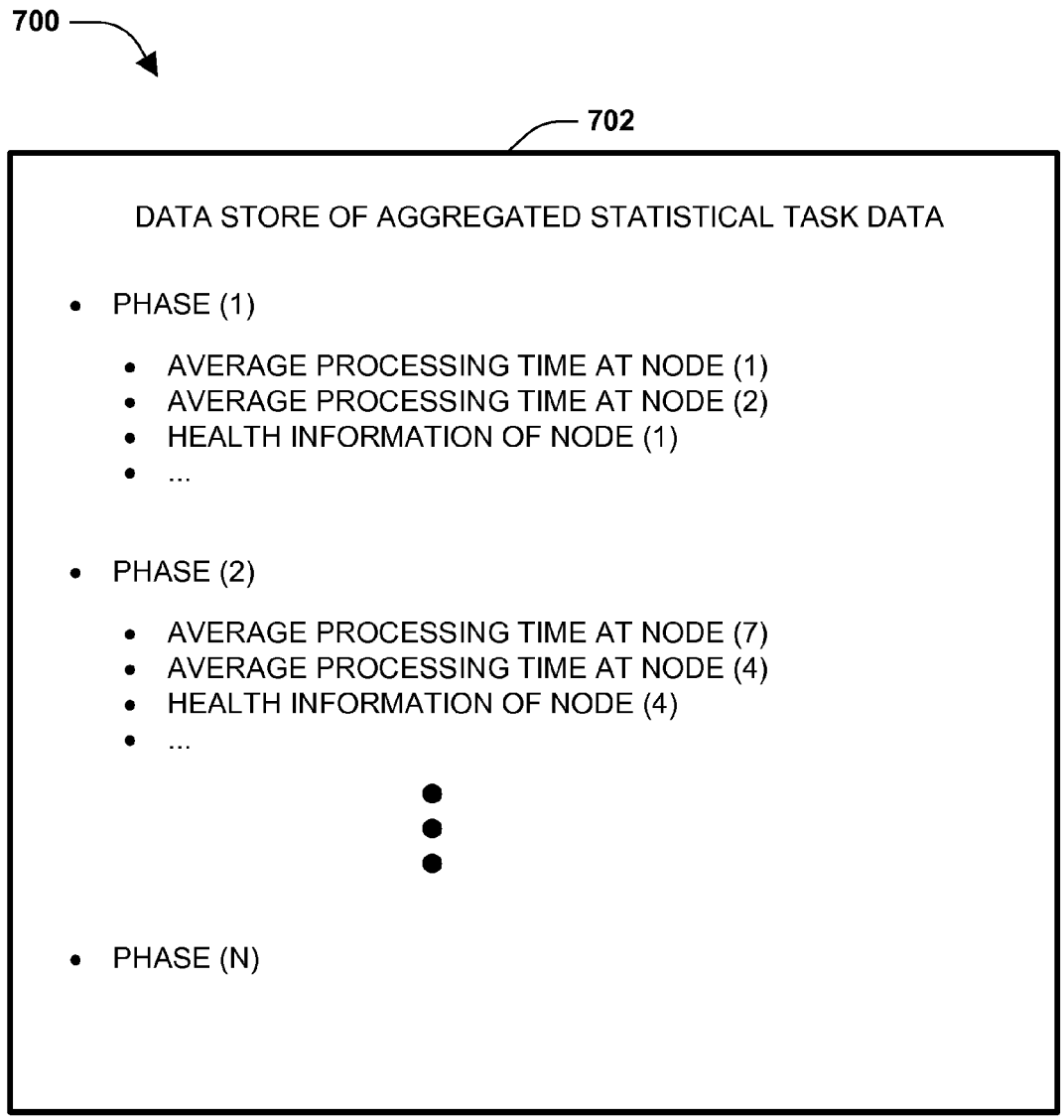
FIG. 7 is an illustration of an example of a data store of aggregated statistical task data.

FIG. 7 illustrates an example 700 of a data store of aggregated statistical task data 702. The statistical task data 702 may be computed from recorded task processing annotations. For example, the aggregated statistical data 702 may be computed on the fly from the statistics vector of recorded task processing annotations 602 of FIG. 6. In this way, the statistical task data 702 may comprise statistics derived from task processing annotations, such as averaged processing time at a node, maximum latency between processing at two nodes, etc.

Figure 8:
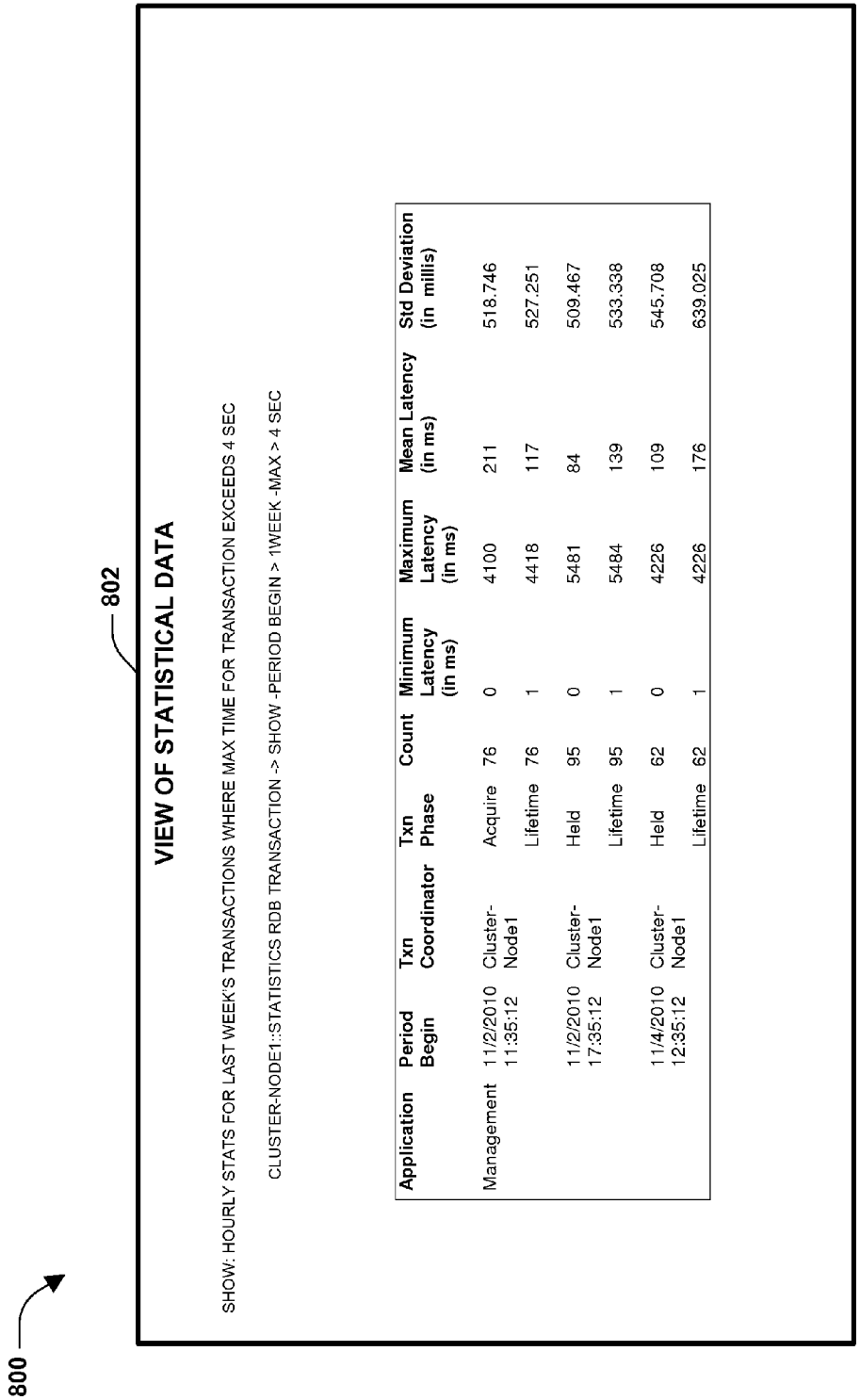
FIG. 8 is an illustration of an example of a view of statistical data corresponding to the processing of one or more multiphase tasks within a cluster network environment.

FIG. 8 illustrates an example 800 of a view of statistical data 802 corresponding to the processing of one or more multiphase tasks within a cluster network environment. In one example, a multiphase task may correspond to a replicated database task for the cluster network environment, where applications may read or modify cluster wide data in a transactional manner. For example, four applications, such as a database access application, a communication application, a virtual filer application, and a management application, may be associated with the replicated database task. An application, such as the management application, may comprise several phases, such as an acquire phase (e.g., a time for an originating node to acquire a transaction from a master node for processing), a hold phase (e.g., a time taken for processing the transaction by the originating node), a local commit (e.g., a time taken to commit the transaction on the master node), a global commit (e.g., a time take to commit the transaction on respective nodes within the cluster network environment).

An analysis model may be incorporated into the replicated database task so that task processing annotations may be recorded and/or aggregated into aggregated statistical data. In one example, the analysis model may specify task processing annotations corresponding to what application generated a transaction, a unique identifier of the transaction, a master node that coordinated that transaction cluster-wide, a label or type of module within the application that created the transaction, a creation time of the transaction, a node originating the transaction, a result of the transaction (e.g., commit, success, fail, abort, etc.), a time taken for the master node to acquire the transaction, a time taken for the originating node to process the transaction, a time taken for the commit on the master node, a time taken for the commit on other nodes within the cluster network environment, a time take for a lifetime of the transaction, etc. For example, the analysis model may be incorporated into the management application, such that task processing annotations may be recorded during the processing of transactions of the management application.

The view of statistical data 802 may provide a bird's eye view of transactions corresponding to user defined statistical criteria. For example, the view of statistical data 802 may provide statistics, such as hourly statistics, of particular periods of transactions, such as one hour periods, corresponding to the user defined statistical criteria, such as: show hourly statistics for last week's transactions where a maximum time for a phase of a transaction within a one hour period exceeded 4 seconds. For example, a user may request to see one hour periods occurring within a time span of Nov. 1, 2010 through Nov. 8, 2010, where a one hour period comprises at least one transaction with a phase having a maximum time greater than 4 seconds. In particular, the user may desire a general view of hourly statistics that may indicate a problem due to a phase taking more than 4 seconds to process. In this way, the view of statistical data 802 may present one hour periods meeting the user defined statistical criteria {e.g., a first period on Nov. 2, 2010 from 11:35:12 to 12:35:12 of 76 transactions where at least one transaction had a phase time greater than 4 seconds (e.g., an acquire phase of a transaction had a maximum latency of 4100 ms and a lifetime phase of a transaction had a maximum latency of 4418 ms); a second period on Nov. 2, 2010 from 17:35:12 to 18:35:12 of 95 transactions where at least one transaction had a phase time greater than 4 seconds (e.g., a held phase of a transaction had a maximum latency of 5481 ms and a lifetime phase of a transaction had a maximum latency of 5484 ms); and a third period on Nov. 4, 2010 from 12:35:12 to 13:35:12 of 62 transactions where at least one transaction had a phase time greater than 4 seconds (e.g., a held phase of a transaction had a maximum latency of 4226 ms and a lifetime phase of a transaction also had a maximum latency of 4226 ms)}. It may be appreciated that other one hour periods may be associated with the week of Nov. 1, 2010 through Nov. 8, 2010, which may not be illustrated within the view of statistical data 802 because such one hour periods do not fit the user defined statistical criteria (e.g., a fourth period on Nov. 5, 2010 from 4:35:12 to 5:35:12 may comprise no transactions having at least one phase with a maximum latency greater than 4 seconds).

It may be appreciated that the view of statistical data 802 provides a general view of periods (e.g., one hour periods), within which at least one transaction of a period meets a user defined statistical criteria. In one example, the view of statistical data 802 may provide a single maximum latency value out of all transactions occurring within a period meeting the user defined statistical criteria, but may not provide details of which transactions and/or how many transactions met the user defined statistical criteria. Accordingly, other views may be generated from aggregated statistical data that may provide various granularities of information that may be used to determine potential problems, for example.

Figure 9:
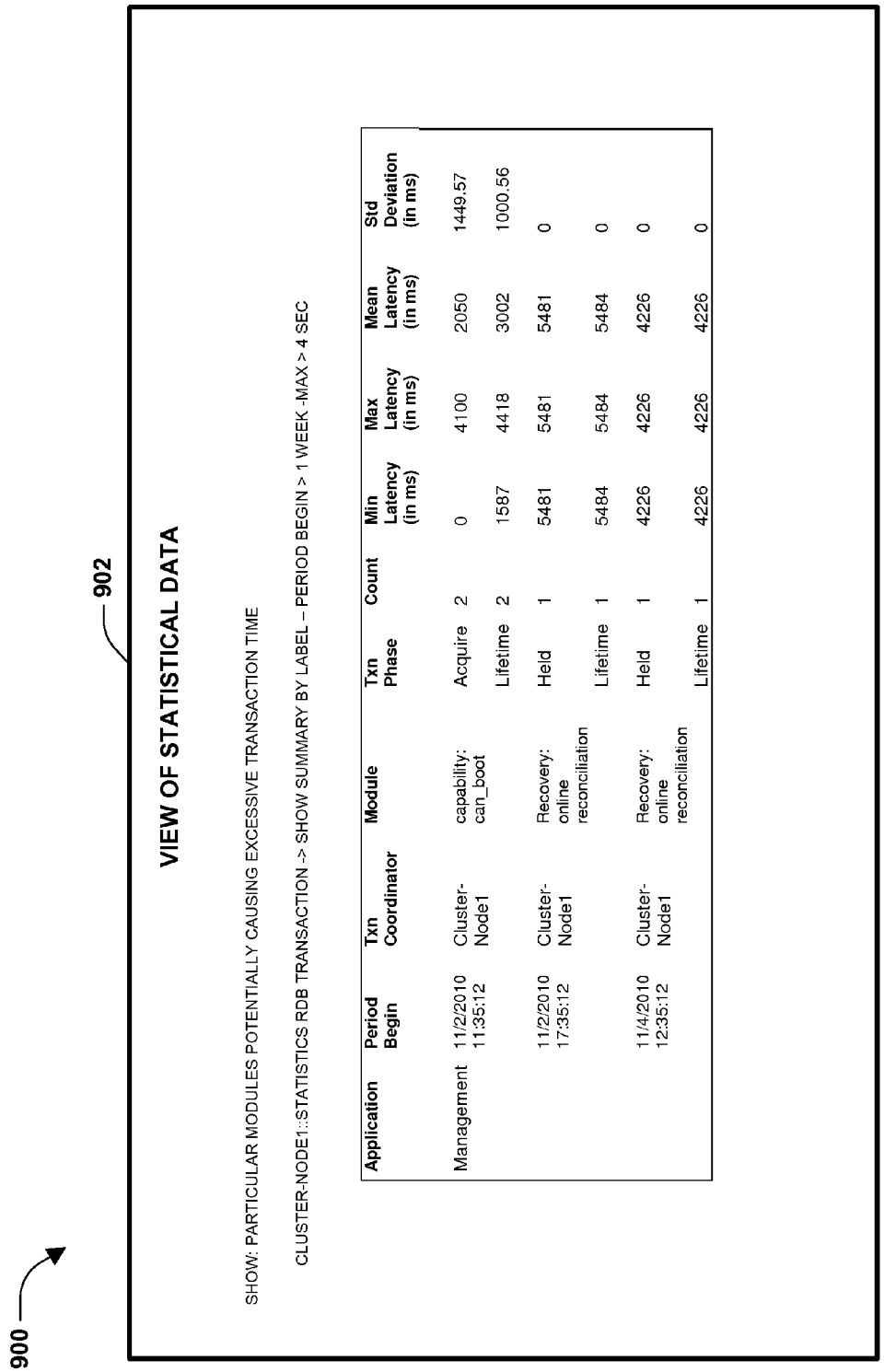
FIG. 9 is an illustration of an example of a view of statistical data corresponding to the processing of one or more multiphase tasks within a cluster network environment.

FIG. 9 illustrates an example 900 of a view of statistical data 902 corresponding to the processing of one or more multiphase tasks within a cluster network environment. In one example, a multiphase task may correspond to a replicated database task for a cluster network environment, where applications may read or modify cluster wide data in a transactional manner. It may be appreciated that the example 900 may relate to the information provided in example 800 (e.g., view of statistical data 902 and view of statistical data 802 may have been derived from similar aggregated statistical task data).

It may be appreciated that an analysis model may be incorporated into the replicated database task, such as within a management application, so that task processing annotations may be recorded and/or aggregated into aggregated statistical data. The view of statistical data 902 may be derived from the aggregated statistical data corresponding to user defined statistical criteria. For example, the view of statistical data 902 may provide statistics, such as hourly statistics, corresponding to user defined statistical criteria, such as: show hourly statistics summarized by module for last week's transactions where a maximum time for a phase of a transaction within a one hour period exceeded 4 seconds, and thus particular modules potentially causing excessive transaction time. It may be appreciated that in one example, a module may be part of an application, such as a management application, that requests and/or processes a transaction. For example, the view of statistical data 902 may indicate particular modules (e.g., capability: can_boot module, recovery: online reconciliation module, etc.) occurring within one hour periods during a time span of Nov. 1, 2010 through Nov. 8, 2010, where a module was associated with a transaction comprising a phase having a maximum time greater than 4 seconds. In particular, a user may request the view of statistical data 902 that provides statistical data summarized by modules because the user may be able to determine which modules may be causing problems (e.g., capability: can_boot module may ordinarily take fewer than 4 seconds and thus may raise a red flag or warrant further inquiry, whereas recovery: online reconciliation may ordinarily take longer than 4 seconds and thus may be ignored).

The view of statistical data 902 may present statistical data summarized by modules meeting the user defined statistical criteria. For example, the view of statistical data 902 may comprise a first period on Nov. 2, 2010 from 11:35:12 to 12:35:12 of 2 capability: can_boot module transactions where at least one capability: can_boot module transaction had an acquire phase with a maximum latency of 4100 and at least one capability: can_boot module transaction had a lifetime phase with a maximum latency of 4418. The view of statistical data 902 may comprise a second period on Nov. 2, 2010 from 17:35:12 to 18:35:12 of 1 recovery: online reconciliation module transaction that had a held phase with a maximum latency of 5481 ms and a lifetime phase with a maximum latency of 5484 ms. The view of statistical data 902 may comprise a third period on Nov. 4, 2010 from 12:35:12 to 13:35:12 of 1 recovery: online reconciliation module transaction that had a held phase with a maximum latency of 4226 ms and a lifetime phase with a maximum latency of 4226 ms as well. In this way, the view of statistical data 902 may provide a user with statistical data summarized by modules so that the user may determine what modules may be causing a problem (e.g., a module associated with a transaction comprising a phase with a high latency, such as greater than 4 seconds). It may be appreciated that other views may be generated from aggregated statistical data that may provide various granularities of information that may be used to determine potential problems, for example.

FIG. 10 illustrates an example 1000 of a view of statistical data 1002 corresponding to the processing of one or more multiphase tasks within a cluster network environment. It may be appreciated that the example 1000 may relate to the information provided in example 800 and example 900 (e.g., view of statistical data 1002, view of statistical data 902, and view of statistical data 802 may have been derived from similar aggregated statistical task data). In one example, view of statistical data 1002 may present three separate details of statistical data (e.g., details (1) 1004, details (2) 1006, and details (3) 1008).

Details (1) 1004 may be derived from aggregated statistical data corresponding to user defined statistical criteria, such as: show capability: can_boot module transactions having a lifetime phase latency greater than 4 seconds. For example, details (1) 1004 may indicate that capability: can_boot module transaction created on Nov. 2, 2010 at 11:56:31 had a lifetime phase of 4418 ms. In this way, details (1) 1004 may provide a user with statistical data at a fine granularity so that the user may determine a particular module/transaction/phase that may be causing problems. For example, details (1) 1004 may illustrate that about ¼ of the lifetime was spent processing the transaction (e.g., 1067 ms held/processing time out of 4418 ms lifetime), while about ¾ of the lifetime was spent committing the transaction (e.g., 2784 ms local commit time at master node), which may indicate the master node may have an I/O problem because of the long 2784 ms time taken to locally commit the transaction.

Details (2) 1006 may be derived from aggregated statistical data corresponding to user defined statistical criteria, such as: show capability: can_boot module transactions having an acquire phase latency greater than 4 seconds. For example, details (2) 1006 may indicate that capability: can_boot module transaction created on Nov. 2, 2010 at 11:56:37 had an acquire phase of 4100 ms. In this way, details (2) 1006 may provide a user with statistical data at a fine granularity so that the user may determine a particular module/transaction/phase that may be causing problems. For example, details (2) 1006 may illustrate that 4100 ms was spent attempting to acquire the transaction from a master node. A user viewing details (2) 1006 may determine that the long time spent acquiring the transaction may indicate a problem at a master node and/or a problem with connectivity to the master node, for example.

Details (3) 1008 may be derived from aggregated statistical data corresponding to user defined statistical criteria, such as: show recovery: online reconciliation module transactions having a held phase latency greater than 4 seconds. For example, details (3) 1008 may indicate that a recovery: online reconciliation module transaction created on Nov. 2, 2010 at 17:39:33 had a held phase of 5481 ms and a recovery: online reconciliation module transaction created on Nov. 4, 2010 at 13:07:01 had a held phase of 4226. A user viewing details (3) 1008 may determine that the long time holding the transaction at the originating node may indicate that the originating node may be abusing the transaction (e.g., the originating node should not perform time-consuming task(s) while holding a transaction lock). In this way, the user may be able to pinpoint issues occurring within the cluster network environment from the view of statistical data 1002.

In another example, views may be generated based upon averaging labels corresponding to task processing annotations, wild carding, range specifications, pattern matching, etc. Additionally, views may be generated based upon user defined specified criteria corresponding to specified time periods for finer grained or coarser views, specified time durations for statistics at a specific time periods, specified values for various fields within a query, etc.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 11:
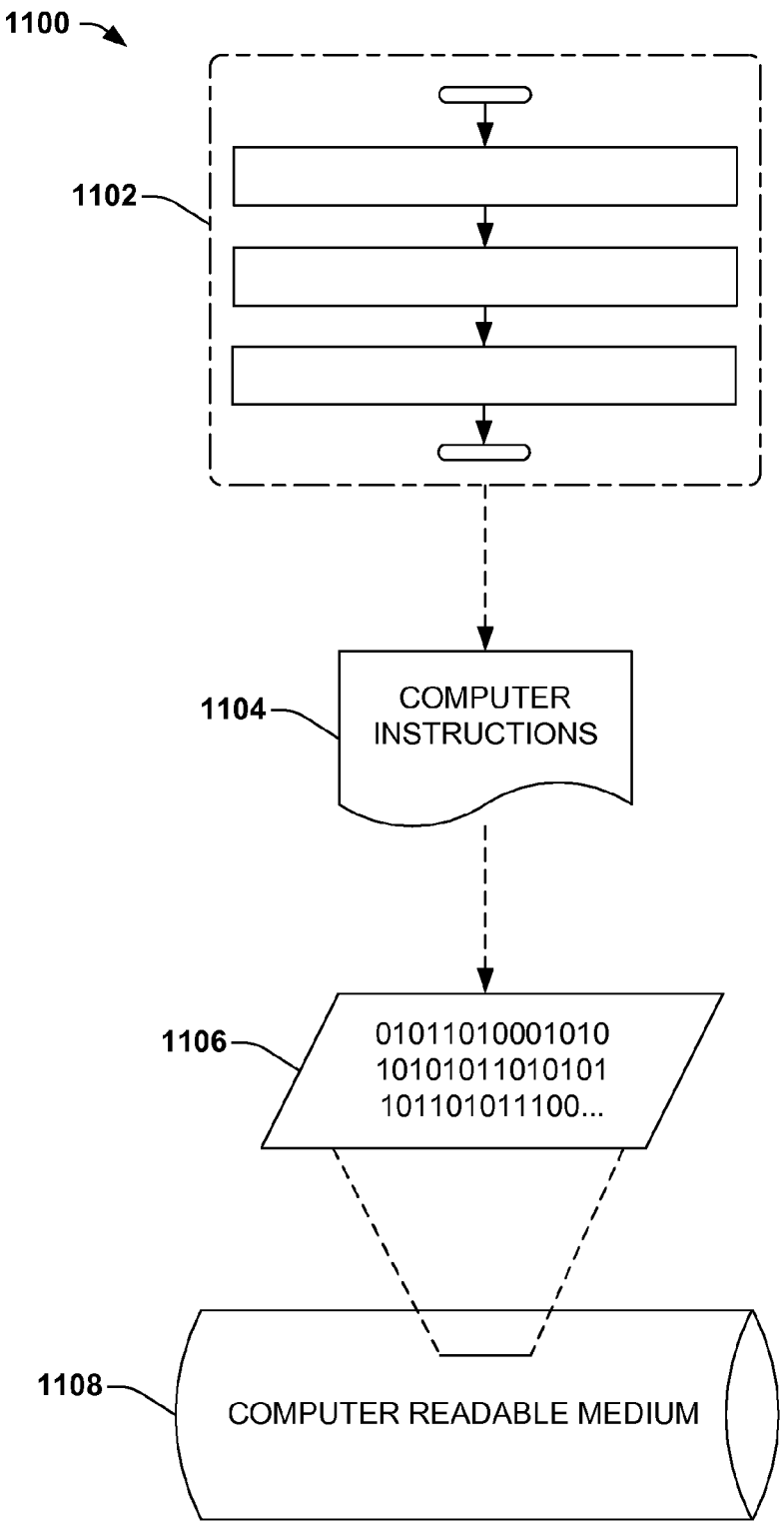
FIG. 11 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, where the implementation 1100 comprises a computer-readable medium 1108 (e.g., a CD-R, DVD-R, platter of a hard disk drive, flash drive, etc.), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102, such as at least some of the method 300 of FIG. 3 or method 400 of FIG. 4, for example, and/or at least some of a system, such as at least some of the system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as may be used herein is intended to encompass a computer program accessible from any computer-readable device, carrier, or media. Of course, those skilled in the art will recognize many modifications may be made to this configuration without departing from the scope or spirit of the claimed subject matter.

It will be appreciated that the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. Also as used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used herein, including the appended claims, may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for incorporating an analysis model into a multiphase task, comprising:
    incorporating an analysis model into a multiphase task to be processed within a clustered network environment, the analysis model specifying task processing annotations to be recorded during one or more phases of processing the multiphase task; and
    during the processing of the multiphase task across one or more nodes within the clustered network environment:
        recording the task processing annotations specified by the analysis model, the recording comprising:
            recording the task processing annotations as subvectors within one or more remote procedures calls to the one or more nodes within the clustered network environment; and
            building a statistics vector from the subvectors, the statistics vector representing the task processing annotations recorded during the processing of the multiphase task; and
        associating the task processing annotations with corresponding phases of the multiphase task.

2. The method of claim 1, the multiphase task comprising a first phase and a second phase, the first phase comprising a first identifier of a first task, the second phase comprising a second identifier of a second task.

3. The method of claim 1, comprising:
    recording first task processing annotations during a first phase associated with a first node within the clustered network environment and recording second task processing annotations during a second phase associated with a second node within the clustered network environment.

4. The method of claim 1, the recording the task processing annotations specified by the analysis model and the associating performed within a process thread owned by the multiphase task.

5. The method of claim 1, comprising:
    uploading the task processing annotations to a node within the clustered network environment.

6. The method of claim 1, comprising:
    aggregating the task processing annotations with previously recorded task processing annotations to generate aggregated statistical task data.

7. The method of claim 6, the aggregating comprising:
    averaging the task processing annotations with the previously recorded task processing annotations.

8. The method of claim 6, comprising:
    receiving a request to generate a view of statistical data, the request comprising user defined statistical criteria; and
    generating the view of statistical data based upon at least a portion of the aggregated statistical task data corresponding to the user defined statistical criteria.

9. The method of claim 8, the view of statistical data corresponding to a phase of the multiphase task during one or more executions of the multiphase task.

10. The method of claim 6, comprising:
    storing the aggregated statistical task data as one or more entries within a data store.

11. The method of claim 1, comprising:
    presenting a view of statistical data based upon the statistics vector.

12. The method of claim 1, a phase of the one or more phases comprising an identifier and one or more associated task processing annotations to be recorded.

13. The method of claim 1, the multiphase task comprising at least one of:
    a data replication task;
    a quorum maintenance task;
    a health task;
    a configuration task;
    an administrative job monitoring task;
    a volume data movement task; or
    a backup task.

14. The method of claim 1, the task processing annotations comprising at least one of:
   start time of a phase;
   end time of the phase;
   processing time of the phase;
   health information of a node;
   a user defined label;
   a user defined measurement criteria;
   a type designation;
   a volume size designation; or
   a source node designation.

15. A system for incorporating an analysis model into a multiphase task, comprising:
   one or more processors;
   and a memory comprising an injection component and a recording component that when executed by at least one of the one or more processors executes:
      the injection component to:
      incorporate an analysis model into a multiphase task to be processed within a clustered network environment, the analysis model specifying task processing annotations to be recorded during one or more phases of processing the multiphase task; and
      the recording component to:
      during the processing of the multiphase task across one or more nodes within the clustered network environment:
      record the task processing annotations specified by the analysis model, comprising:
      recording the task processing annotations as subvectors within one or more remote procedures calls to the one or more nodes within the clustered network environment; and
      building a statistics vector from the subvectors, the statistics vector representing the task processing annotations recorded during the processing of the multiphase task; and
      associate the task processing annotations with corresponding phases of the multiphase task.

16. The system of claim 15, the multiphase task comprising a first phase and a second phase, the first phase comprising a first identifier of a first task, the second phase comprising a second identifier of a second task.

17. The system of claim 15, the recording component configured to:
   record the task processing annotations within a thread owed by the multiphase task.

18. The system of claim 15, wherein the memory further comprises an analysis component that when executed by the at least one of the one or more processors executes: the analysis component to:
   receive the task processing annotations from the recording component; and
   aggregate the task processing annotations with previously recorded task processing annotations to generate aggregated statistical task data.

19. The system of claim 18, the analysis component configured to:
   receive a request to generate a view of statistical data, the request comprising user defined statistical criteria; and
   generate the view of statistical data based upon at least a portion of the aggregated statistical task data corresponding to the user defined statistical criteria.

20. A non-transitory computer readable storage medium comprising computer executable instructions that when executed via a microprocessor perform a method for tracking the processing of a multiphase task within a clustered network environment, comprising:
   incorporating an analysis model into a multiphase task to be processed within a clustered network environment, the analysis model specifying task processing annotations to be recorded during one or more phases of processing the multiphase task; and
   during the processing of the multiphase task across one or more nodes within the clustered network environment:
   recording the task processing annotations specified by the analysis model, the recording comprising:
   recording the task processing annotations as subvectors within one or more remote procedures calls to the one or more nodes within the clustered network environment; and
   building a statistics vector from the subvectors, the statistics vector representing the task processing annotations recorded during the processing of the multiphase task; and
   associating the task processing annotations with corresponding phases of the multiphase task.

21. The method of claim 20, comprising:
presenting performance data of the clustered network environment based upon the statistics vector.

* * * * *